(12) United States Patent
Kuninaka

(10) Patent No.: US 9,236,672 B2
(45) Date of Patent: Jan. 12, 2016

(54) HOLDING METAL FITTING, CONNECTOR COUPLER, AND CONNECTOR

(75) Inventor: Tsuyoshi Kuninaka, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/343,270

(22) PCT Filed: Sep. 6, 2012

(86) PCT No.: PCT/JP2012/005671
§ 371 (c)(1),
(2), (4) Date: Mar. 6, 2014

(87) PCT Pub. No.: WO2013/035338
PCT Pub. Date: Mar. 14, 2013

(65) Prior Publication Data
US 2014/0220817 A1   Aug. 7, 2014

(30) Foreign Application Priority Data

Sep. 9, 2011   (JP) .................................. 2011-196663

(51) Int. Cl.
*H01R 12/57* (2011.01)
*H01R 12/71* (2011.01)
*H01R 12/73* (2011.01)

(52) U.S. Cl.
CPC .............. *H01R 12/712* (2013.01); *H01R 12/73* (2013.01); *Y10T 403/7039* (2015.01)

(58) Field of Classification Search
CPC .. H01R 23/7063; H01R 12/57; H01R 23/725; H01R 9/096
See application file for complete search history.

(56) References Cited

U.S. PATENT DOCUMENTS

| 5,591,047 | A | * | 1/1997 | Yamada et al. ............. 439/541.5 |
| 5,704,807 | A | * | 1/1998 | Sherman et al. ............... 439/570 |
| 6,132,248 | A | * | 10/2000 | Ramey ........................... 439/570 |
| 6,231,386 | B1 | * | 5/2001 | Wu ................................ 439/570 |

(Continued)

FOREIGN PATENT DOCUMENTS

| EP | 1 881 562 A2 | 1/2008 |
| JP | 2006-059596 A | 3/2006 |

(Continued)

OTHER PUBLICATIONS

International Search Report issued in International Application No. PCT/JP2012/005671 with Date of mailing Dec. 4, 2012, with English Translation.

(Continued)

*Primary Examiner* — Gary Paumen
(74) *Attorney, Agent, or Firm* — McDermott Will & Emery LLP

(57) ABSTRACT

A holding metal fitting includes: a side plate portion extending in a width direction X of a socket (a connector coupler); a bottom plate portion connected to a lower side of the side plate portion; an attachment piece portion a projecting from the bottom plate portion to the outside of a socket housing (a housing) and being attached and fixed to a circuit board; and an anchor portion extending from the side plate portion into the socket housing. Moreover, an outer wall surface (a wall surface) of the anchor portion includes an engagement portion for a resin inside the housing to engage with.

14 Claims, 10 Drawing Sheets

(56) References Cited

U.S. PATENT DOCUMENTS

| | | | |
|---|---|---|---|
| 6,626,689 B1* | 9/2003 | Yu | 439/159 |
| 7,112,091 B2* | 9/2006 | Okura et al. | 439/570 |
| 7,488,208 B2* | 2/2009 | Takahashi et al. | 439/570 |
| 7,540,770 B2* | 6/2009 | Ishizuka et al. | 439/570 |
| 7,722,408 B2* | 5/2010 | Miyazaki et al. | 439/660 |
| 7,736,177 B2* | 6/2010 | Tsai | 439/570 |
| 7,850,486 B2* | 12/2010 | Zhu | 439/570 |
| 7,985,080 B2* | 7/2011 | Ai | 439/79 |
| 8,388,373 B2* | 3/2013 | Wang et al. | 439/570 |
| 8,764,470 B2* | 7/2014 | Little et al. | 439/284 |
| 2006/0264075 A1 | 11/2006 | Obikane et al. | |
| 2006/0264097 A1 | 11/2006 | Nakano et al. | |
| 2008/0020595 A1 | 1/2008 | Takahashi et al. | |
| 2008/0268711 A1 | 10/2008 | Miyazaki et al. | |

FOREIGN PATENT DOCUMENTS

| | | |
|---|---|---|
| JP | 2006-324189 A | 11/2006 |
| JP | 2006-331679 A | 12/2006 |
| JP | 2008-270099 A | 11/2008 |

OTHER PUBLICATIONS

Chinese Search Report issued in corresponding Chinese Patent Application No. 201280043144.4, mailed on Jun. 25, 2015; 3 pages in English translation.

* cited by examiner

HOLDING METAL FITTING, CONNECTOR COUPLER, AND CONNECTOR

RELATED APPLICATIONS

This application is the U.S. National Phase under 35 U.S.C. §371 of International Application No. PCT/JP2012/005671, filed on Sep. 6, 2012, which in turn claims the benefit of Japanese Application No. 2011-196663, filed on Sep. 9, 2011, the disclosures of which Application is incorporated by reference herein.

TECHNICAL FIELD

The present invention relates to a holding metal fitting, a connector coupler using the holding metal fitting, and a connector using the holding metal fitting.

BACKGROUND ART

There has heretofore been used a connector designed to be capable of fixing contacts (terminals) of a socket to a circuit board and thus firmly joining the socket and the circuit board together by: burying a holding metal fitting provided with attachment piece portion portions into a housing of the socket (a connector coupler); and fixing the attachment piece portion portions of the holding metal fitting to the circuit board by soldering or the like (see Patent Literature 1, for example).

The holding metal fitting includes a side plate portion extending in a width direction of the socket, and a bottom plate portion connected to a lower side of the side plate portion. In addition, the above-described attachment piece portion portions are formed on the bottom plate portion while an anchor portion is provided on the side plate portion so that the housing can improve rigidity and strength.

CITATION LIST

Patent Literature

[PTL 1] Japanese Patent Application Publication No. 2008-270099

SUMMARY OF INVENTION

Technical Problem

In the conventional holding metal fitting, however, the anchor portion is merely extended from the side plate portion into the housing. As a consequence, the holding metal fitting is liable to be easily detached from the housing due to an external force or the like.

An object of the present is to obtain a holding metal fitting which is capable of further reducing a risk of detachment from a housing of a connector coupler, and to obtain a connector coupler and a connector each using the holding metal fitting.

Solution to Problem

For the purpose of achieving the foregoing object, a gist of a first feature of the present invention is a holding metal fitting to be buried in a housing of a connector coupler, including: a side plate portion extending in a width direction of the connector coupler; a bottom plate portion connected to a lower side of the side plate portion; an attachment piece portion projecting from the bottom plate portion to the outside of the housing and being attached and fixed to a circuit board; and an anchor portion extending from the side plate portion into the housing. In the holding metal fitting, a wall surface of the anchor portion includes an engagement portion for a resin inside the housing to engage with.

A gist of a second feature thereof is that the engagement portion is a recessed portion formed in the wall surface of the anchor portion.

A gist of a third feature thereof is that the engagement portion is a through-hole formed to penetrate through the wall surface of the anchor portion.

A gist of a fourth feature thereof is that the engagement portion is a projecting portion formed to project from the wall surface of the anchor portion.

A gist of a fifth feature thereof is that the anchor portion extends from the sideplate portion along a longitudinal direction of the connector coupler.

A gist of a sixth feature thereof is that the wall surface of the anchor portion includes a plurality of the engagement portions.

A gist of a seventh feature thereof is a connector coupler including the holding metal fitting according to the first or second feature thereof.

A gist of an eighth feature thereof is a connector including connector couplers, in which at least one of the connector couplers is the connector coupler according to the 7th feature thereof.

Advantageous Effects of Invention

According to the present invention, the wall surface of the anchor portion is provided with the engagement portion that the resin inside the housing engages with. This makes it possible to further suppress detachment of the holding metal fitting from the housing.

Specifically, according to the present invention, it is possible to obtain a holding metal fitting which is capable of further reducing a risk of its detachment from the housing of the connector coupler even if an external force or the like is inputted, and to obtain a connector coupler and a connector each using the holding metal fitting.

DESCRIPTION OF EMBODIMENTS

An embodiment of the present invention will be described below in detail with reference to the drawings.

Figure 1:
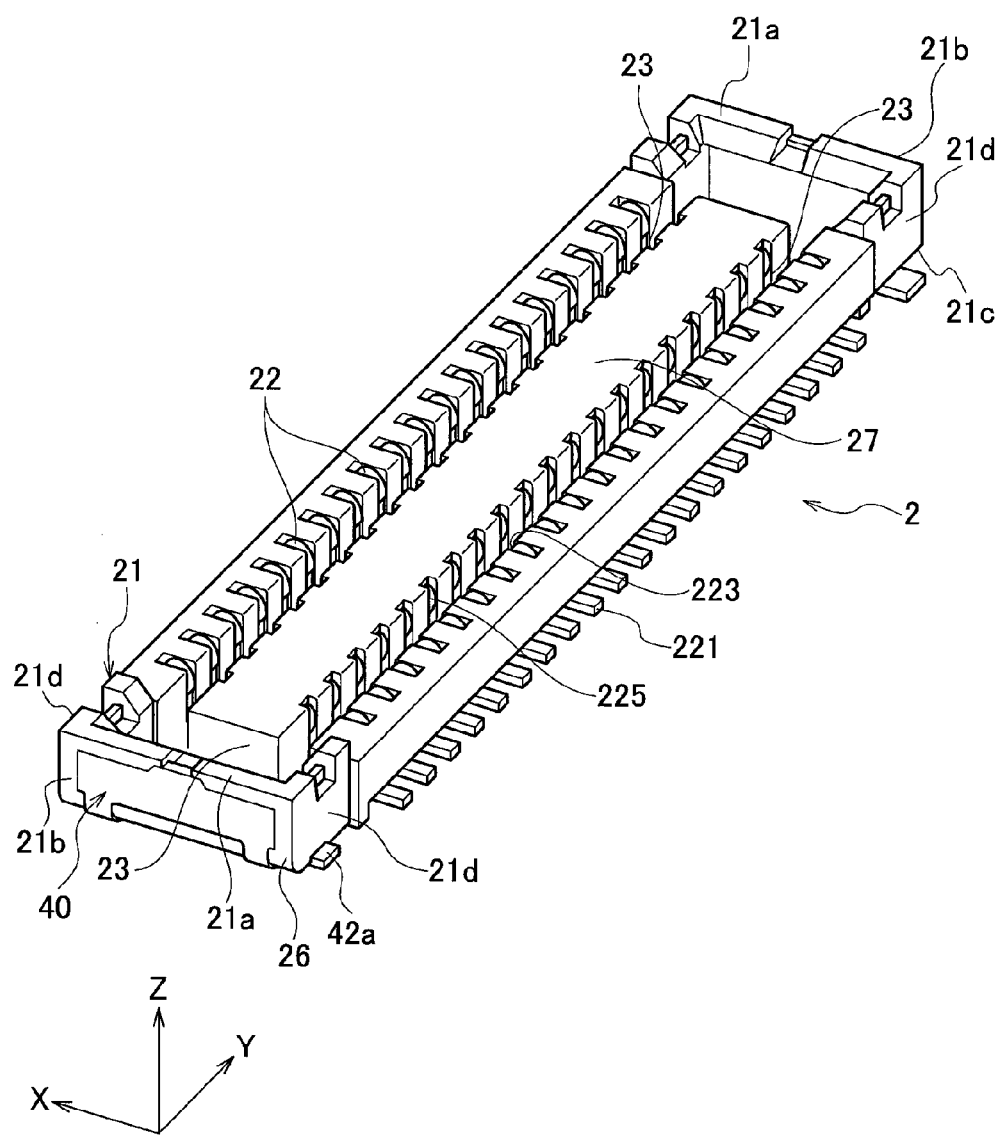
FIG. 1 is a perspective view showing a socket of a connector according to an embodiment of the present invention.
Figure 2:
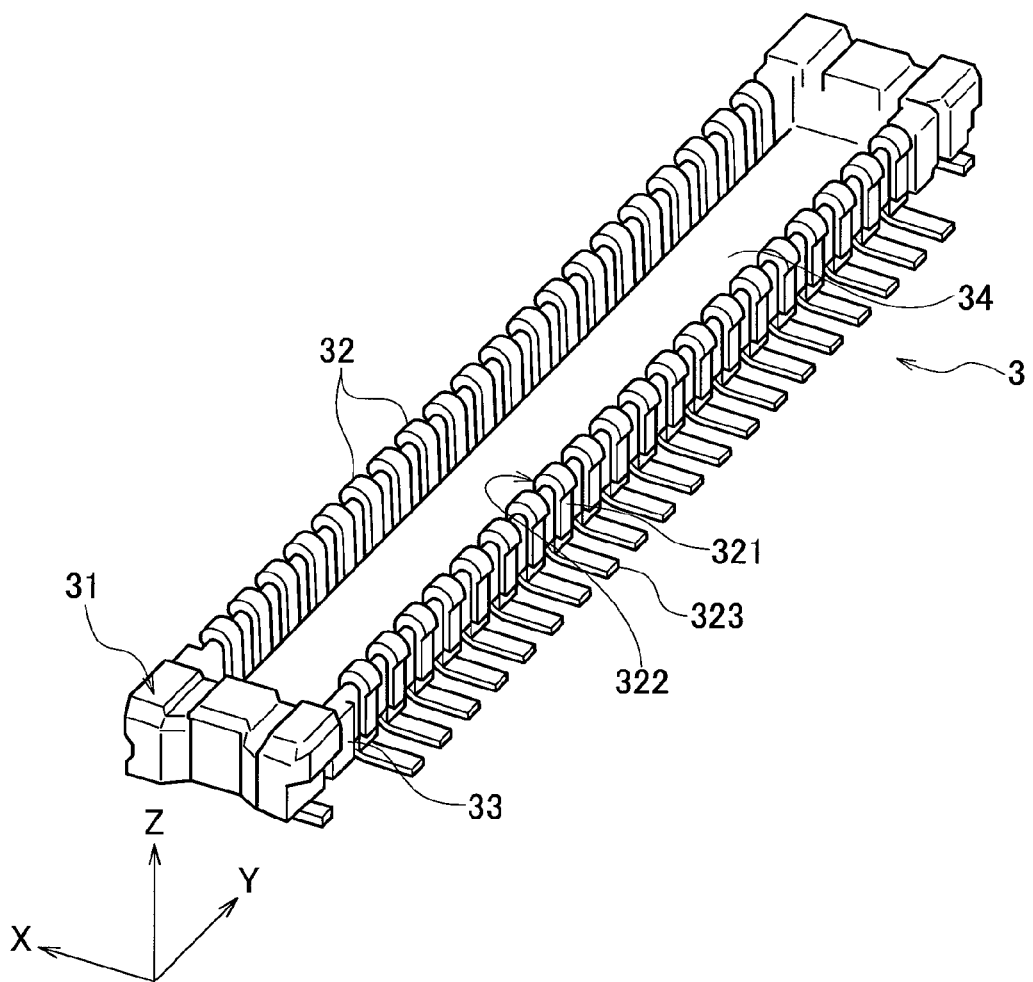
FIG. 2 is a perspective view showing a header of the connector according to the embodiment of the present invention.
Figure 3:
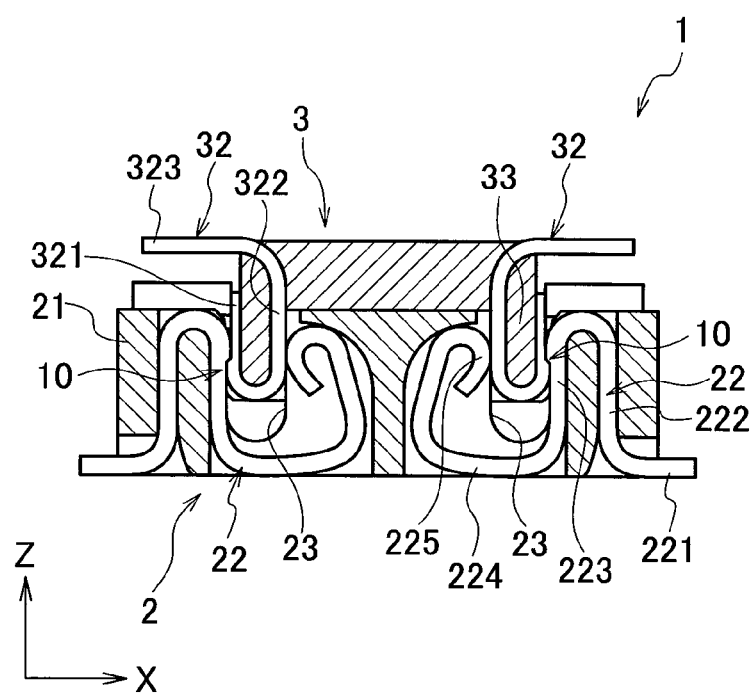
FIG. 3 is a cross-sectional view showing the connector according to the embodiment of the present invention.

FIG. 1 to FIG. 5 show an embodiment of a connector 1 according to the present invention. As shown in FIG. 3, the connector 1 of the embodiment includes a socket 2 and a header 3 which are fitted to each other. In the description of the embodiment, the X direction in the drawings will be defined as a width direction of the connector 1, the Y direction therein will be defined as a longitudinal direction thereof, and the Z direction therein will be defined as a vertical direction thereof.

As shown in FIG. 1, the socket 2 includes a socket housing 21, which is made of an insulative synthetic resin or the like and is shaped like a rectangle (oblong) as a whole in a plan view. In the socket housing 21, multiple contacts 22 are disposed along each of the mutually opposing long sides at a predetermined pitch in the longitudinal direction Y.

The socket housing 21 includes: a peripheral wall portion which is continuously formed substantially into a rectangular annular shape along a peripheral edge portion of the socket housing 21; and an island portion 27 having a substantially rectangular shape which is formed at a central portion of the socket housing 21 and with predetermined clearances from the peripheral wall portion 26. In addition, a fitting groove portion 23 for fitting the header 3 is formed between the peripheral wall portion 26 and the island portion 27.

Each contact 22 is formed by bending an elastic material having conductivity such as an elongated metal. As shown in FIG. 3, each contact 22 includes a terminal portion 221, a held portion 222, a first contact portion 223, a connection portion 224, and a second contact portion 225.

The terminal portion 221 projects outward in the width direction X of the socket housing 21. The held portion 222 to be held by the socket housing 21 is formed to extend upward from an inner end portion of the terminal portion 221. The first contact portion 223 is formed to extend downward from an upper end portion of the held portion 222 while being curved toward the inside of the socket housing 21. The connection portion 224 is formed to extend further toward the inside of the socket housing 21 from a lower end portion of the first contact portion 223. The second contact portion 225 is formed to rise upward from an inner end portion of the connection portion 224, with its tip end portion being curved in such a manner as to face the first contact portion 223.

Moreover, the first contact portion 223 and the second contact portion 225 are provided with resilient forces in mutually opposite directions. The first contact portion 223 and the second contact portion 225 are located to be exposed to the inside of the fitting groove portion 23 of the socket housing 21 described above.

The terminal portions 221 are located to project outward along a lower end of the socket housing 21. The projecting terminal portions 221 are connected to a conductor pattern (terminals) on one of not-illustrated circuit boards by soldering.

Meanwhile, as shown in FIG. 2, the header 3 includes a header housing 31, which is made of an insulative synthetic resin or the like and is shaped like a rectangle (oblong) as a whole. In the header housing 31, multiple posts 32 are disposed along each of the mutually opposing long sides at the same pitch in the longitudinal direction Y as the contacts 22.

The header housing 31 includes a peripheral wall portion which is continuously formed substantially into a rectangular annular shape along a peripheral edge portion of the header housing 31. Moreover, a substantially flat bottom wall portion 34 is formed on the inside of the peripheral wall portion 33.

As is the case in the contacts 22, each post 32 is formed by bending an elastic material having conductivity such as an elongated metal. As shown too in FIG. 3, each post 32 includes a first contact portion 321, a second contact portion 322, and a terminal portion 323.

The first contact portion 321 is provided to be exposed to an outer side surface of the peripheral wall portion 33. The second contact portion 322 is formed by being bent into an inverted U shape from an upper end portion (a lower side in FIG. 3) of the first contact portion 321. The terminal portion 323 is formed to project outward from a lower end portion (an upper side in FIG. 3) of the second contact portion 322 in the width direction X of the header housing 31.

In addition, the first contact portion 321 and the second contact portion 322 are insert-molded in the header housing 31 while locating the first contact portion 321 and the second contact portion 322 in such a manner as to extend over a tip end side of the peripheral wall portion 33 and causing the base end portion of the second contact portion 322 to penetrate a root portion (an upper side in FIG. 3) of the peripheral wall portion 33. In this state, the terminal portions 323 of the posts 32 project outward along a lower end of the header housing 31, and the terminal portions 323 are connected to a conductor pattern (terminals) on a not-illustrated second circuit board by soldering.

As shown in FIG. 3, the header 3 is fitted to the socket 2 by inserting and fitting the peripheral wall portion 33 of the header housing 31 into the fitting groove portion 23 of the socket housing 21. At this time, the first contact portion 223 of each contact 22 resiliently comes into contact with the first contact portion 321 of the corresponding post 32. Meanwhile, the second contact portion 225 of each contact 22 resiliently comes into contact with the second contact portion 322 of the corresponding post 32. As a consequence, the contacts 22 and the corresponding posts 32 are electrically connected to one another. Eventually, the conductor pattern on the one circuit board and the conductor pattern on the other circuit board are electrically connected to each other.

Moreover, each contact 22 and each corresponding post 32 of the embodiment are provided with a lock mechanism 10 designed to retain a bonded state between the socket 2 and the header 3 by establishing engagement between the mutually opposing terminals. The lock mechanism 10 of the embodiment includes a stepped surface formed on the first contact portion 223 of the contact 22, and another stepped surface formed on the first contact portion 321 of the post 32.

Accordingly, when the header 3 is fitted to the socket 2, the contact portions 321 and 322 of the post 32 are inserted and attached to the contact portions 223 and 225 of the contact 22 while pushing the contact portions 223 and 225 open against their elastic forces. Then, the stepped surfaces of each lock mechanism 10 are engaged with each other as illustrated, so that the socket 2 and the header 3 can be locked to each other and retain the bonded state.

In the meantime, when the socket 2 and the header 3 are detached from each other, the socket 2 and the header 3 are pulled away in detaching directions. Thus, the stepped surfaces of the lock mechanism 10 relatively slide on each other and the contact portions 321 and 322 of the post 32 push the contact portions 223 and 225 of the contact 22 open, thereby releasing the engagement by the lock mechanism 10. Thus, the socket 2 and the header 3 can be separated from each other.

Figure 4:
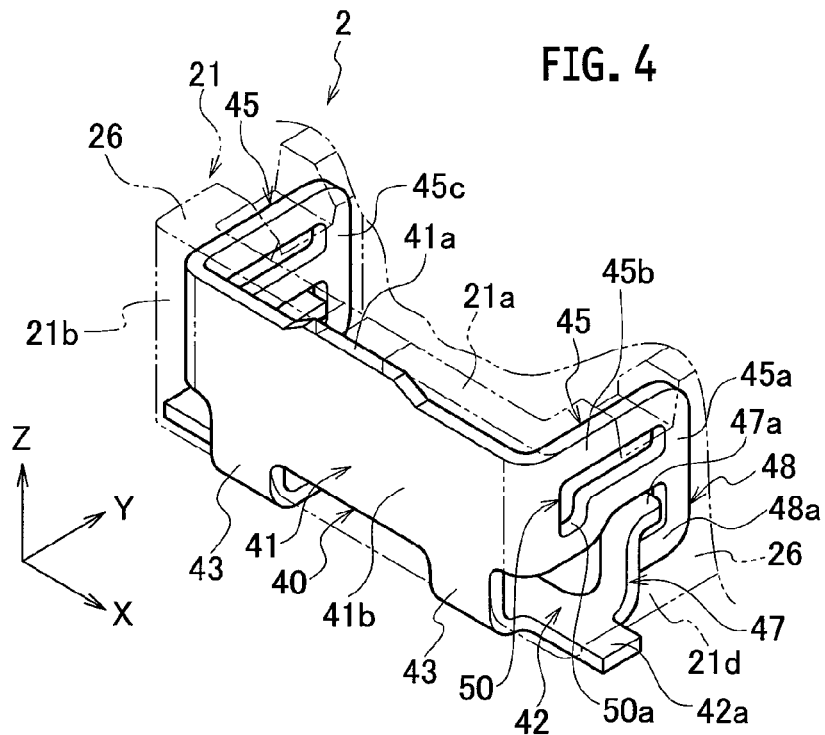
FIG. 4 is a see-through perspective view showing a state in which a holding metal fitting is attached to a socket housing, which is illustrated in FIG. 1.
Figure 5:
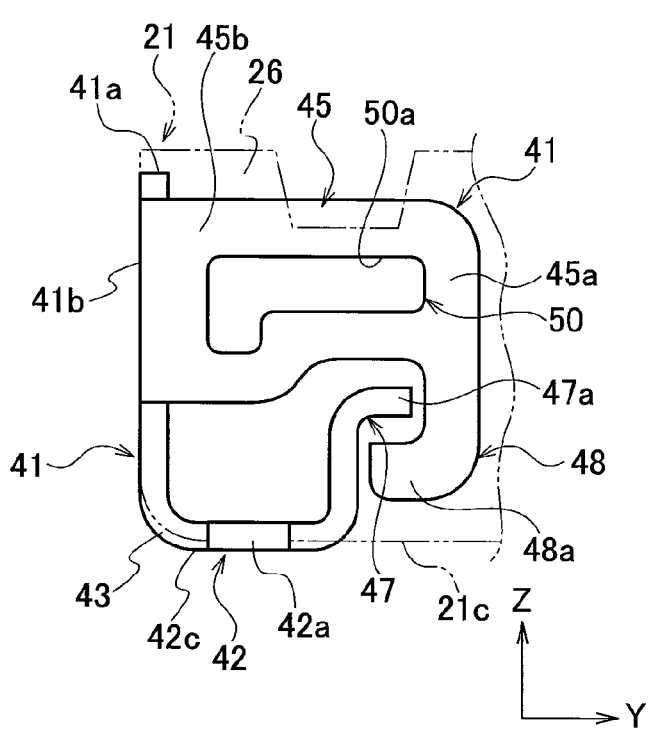
FIG. 5 is a side view of the state shown in FIG. 4.

FIG. 4 is a see-through perspective view showing an end portion in the longitudinal direction Y of the socket housing 21 shown in FIG. 1, and FIG. 5 is a side view of the end portion shown in FIG. 4. As shown in FIG. 4 as well as FIG. 1, in the embodiment, holding metal fittings 40 are buried in two end portions in the longitudinal direction Y of the socket housing (a housing) 21 of the socket (a connector coupler) 2.

Each holding metal fitting 40 includes attachment piece portions 42a which project to the outside of the socket housing 21. Moreover, the attachment piece portions 42a are fixed to the one circuit board by soldering or the like. Thus, the attachment piece portions 42a are designed to firmly bond the socket 2 to the one circuit board in combination with the connection terminal portions 221 of the contacts 22 which are soldered to the one circuit board.

Each holding metal fitting 40 is formed by pressing a metal plate having a predetermined thickness. The holding metal fitting 40 includes a side plate portion 41 extending in the width direction X of the socket 2, and bottom plate portions 42 formed by bending lower sides at two end portions of the side plate portion 41 almost perpendicularly toward the center in the longitudinal direction Y of the socket 2. Moreover, the attachment piece portions 42a are formed by causing two end portions of the bottom plate portions 42 to project outward from two sides in the width direction X of the socket 2.

In addition, the holding metal fitting 40 includes anchor portions 45 extending from the side plate portion 41 into the socket housing 21. In the embodiment, a pair of anchor portions 45 are formed by bending the two end portions in the width direction X of the side plate portion 41 almost perpendicularly toward the center in the longitudinal direction Y of the socket 2. Further, the pair of anchor portions 45 are respectively located inside the peripheral wall portion 26 on two sides in the width direction X of the socket housing 21, and cut into the socket housing 21 in the state of extending in the longitudinal direction Y thereof.

Meanwhile, as shown too in FIG. 5, the holding metal fitting 40 of the embodiment includes lock piece portions 47, which are formed by being bent upward from the pair of bottom plate portions 42 and then causing tip end portions 47a of the lock piece portions 47 to be bent back almost perpendicularly and toward the center in the longitudinal direction Y of the socket 2, respectively. On the other hand, the anchor portions 45 are provided with lock piece portions 48, which are formed by being extended downward from tip end portions 45a of the pair of anchor portions 45 and then causing tip end portions 48a of the lock piece portions 48 to be bent back almost perpendicularly and outward in the longitudinal direction Y of the socket 2, respectively. Moreover, the tip end portion 47a of each of the lock piece portions 47 and the tip end portion 48a of the corresponding lock piece portion 48 are disposed opposite to each other with a small clearance therebetween.

The above-described holding metal fittings 40 are integrally insert-molded in the peripheral wall portion 26 of the socket housing 21 and are put to use. At this time, each holding metal fitting 40 is attached to the socket housing 21 in such a manner that the side plate portion 41 and the bottom plate portions 42 are exposed along an outer wall surface of the peripheral wall portion 26 of the socket housing 21.

Specifically, an outer side surface 41b of the sideplate portion 41 is exposed along an end surface 21b in the longitudinal direction Y of the socket housing 21 and in a state substantially flush with the end surface 21b. At the same time, a top surface 41a of the side plate portion 41 is exposed in such a manner as to be back from an upper end surface 21a of the socket housing 21. Moreover, as shown in FIG. 5, a lower surface 42c of each bottom plate portion 42 connected to the lower side of the side plate portion 41 is exposed to a lower end surface 21c of the socket housing 21. Furthermore, the attachment piece portions 42a to be soldered to the one circuit board are provided in such a manner as to project by a predetermined amount from two end surfaces 21d in the width direction of the socket housing 21.

Here, in the embodiment, an engagement portion 50 for a resin inside the socket housing 21 to engage with is provided in the wall surface of each anchor portion 45 described above. To be more precise, as shown in FIG. 4 and FIG. 5, the engagement portion 50 in the embodiment is formed as a through-hole 50a which penetrates from an outer wall surface 45b to an inner wall surface 45c of the anchor portion 45.

In the embodiment, the through-hole 50a is formed as the substantially L-shaped through-hole 50a which includes: a band-shaped long hole extending in the longitudinal direction Y of the anchor portion 45; and a band-shaped short hole extending downward from one end on an outer side in the longitudinal direction Y of the long hole.

Accordingly, by insert-molding the anchor portion 45 provided with the through-hole 50a into the socket housing 21, the resin that forms the socket housing 21 enters the through-hole 50a and is engaged with the through-hole 50a.

As a consequence, when a force such as an external force is applied to the holding metal fitting 40 in a detaching direction, the anchor portion 45 is caught and locked with the resin inside the through-hole 50a. Thus, it is possible to further suppress the detachment of the holding metal fitting 40 from the socket housing 21.

Specifically, the conventional configuration without provision of the engagement portion 50 has a risk that, when a high impact is applied to the socket 2, the side plate portion 41 of the holding metal fitting 40 may be turned outward in the longitudinal direction Y from the socket housing 21 pivotally around its bent portion 43 serving as a pivot point. Particularly, in the configuration in which part of the holding metal fitting 40 is exposed to the upper end surface 21a of the socket housing 21, an operator may grab that part with fingers and the like. In this regard, there is a risk that the holding metal fitting 40 may be turned and detached in case of application of an unintended force in such a direction to push down the side plate portion 41 due to a pressure for fitting the socket 2 and the header 3 to each other, for instance.

In contrast, in the embodiment, the through-holes 50a for the resin inside the socket housing 21 to engage with are formed in the wall surfaces (the outer wall surfaces 45b and the inner wall surfaces 45c) of the anchor portions 45. For this reason, when the force is applied to the direction to push down the side plate portion 41, the through-holes 50a can lock the anchor portions 45 to the resin inside the socket housing 21. Thus, it is possible to further suppress the turn of the side plate portion 41 pivotally around the bent portion 43, and thereby to further reduce the risk of the detachment of the holding metal fitting 40 from the socket housing 21.

As described above in detail, in this embodiment, the wall surfaces (the outer wall surfaces 45*b* and the inner wall surfaces 45*c*) of the anchor portions 45 are provided with the engagement portions 50 for the resin inside the socket housing 21 to engage with. Accordingly, it is possible to further suppress the detachment of the holding metal fitting 40 from the socket housing 21, and to further prevent the peripheral wall portion 26 of the socket housing 21 from damage attributed to the detachment of the holding metal fitting 40.

In other words, according to the embodiment, it is possible to obtain the holding metal fitting 40 capable of further reducing the risk of the detachment from the socket housing 21 in case of an input of an external force or the like, and to obtain the socket 2 (the connector coupler) and the connector 1 each using the holding metal fitting 40.

Meanwhile, in the embodiment, the engagement portion 50 is formed as the through-hole 50*a* which penetrates from the outer wall surface 45*b* to the inner wall surface 45*c* of the anchor portion 45. For this reason, it is possible to cause the resin inside the socket housing 21 to communicate between the outer wall surface 45*b* side and the inner wall surface 45*c* side of the anchor portion 45. Thus, it is possible to enhance engagement strength between the engagement portion 50 and the resin, and to further suppress the detachment of the holding metal fitting 40.

Moreover, in the embodiment, the anchor portion 45 extends from the side plate portion 41 in the longitudinal direction Y of the socket 2. Accordingly, the through-hole 50*a* (the engagement portion 50) can be formed in the width direction X, which is orthogonal to the longitudinal direction Y parallel to the direction to turn over (detach) the side plate portion 41. Thus, it is possible to further suppress the turn of the holding metal fitting 40 pivotally around the bent portion 43.

Meanwhile, in this embodiment, the top surface 41*a* of the side plate portion 41 is not exposed along the upper end surface 21*a* of the socket housing 21 as shown in FIG. 1 and FIG. 4, when the holding metal fitting 40 is insert-molded in the socket housing 21. For this reason, it is possible to inhibit an operator from grabbing the top surface 41*a* of the side plate portion 41 with fingers and the like, and thus to reduce a risk that the operator will push down the side plate portion 41 and turn the holding metal fitting 40.

Furthermore, as shown in FIG. 5, the holding metal fitting 40 of the embodiment includes the lock piece portion 47 and the lock piece portion 48, with their tip end portions 47*a* and 48*a* opposed to each other with the small clearance therebetween. For this reason, in case the holding metal fitting 40 is turned pivotally around the bent portion 43, the tip end portions 47*a* and 48*a* of the lock piece portions 47 and 48 can be locked to each other. Thus, the embodiment has an advantage that it is possible to suppress the further turn of the holding metal fitting 40 and thereby to prevent damage of the peripheral wall portion 26 of the socket housing 21.

In the embodiment, the tip end portion 47*a* of the lock piece portion 47 and the tip end portion 48*a* of the lock piece portion 48 are opposed to each other with the small clearance therebetween. Instead, the lock piece portions 47 and 48 may be insert-molded into the socket housing 21 in a state locked to each other without providing any clearance. If done so, it is possible to further enhance the strength of the holding metal fitting 40 in terms of the turning direction and thereby to further reduce the risk of detachment of the holding metal fitting 40 from the socket housing 21.

Next, modified examples of the holding metal fitting 40 of the embodiment will be described with reference to FIG. 6 to FIG. 12.

Figure 6:
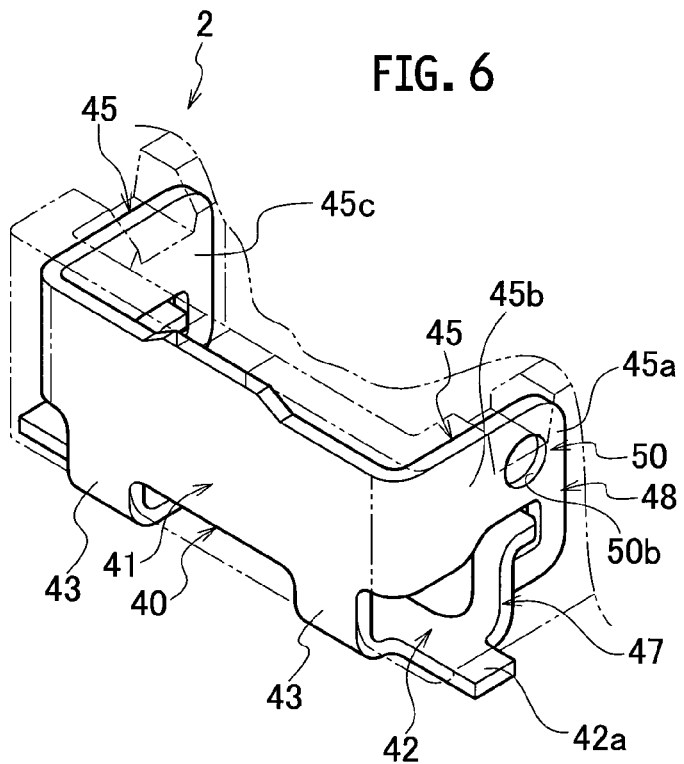
FIG. 6 is a view showing a first modified example of the holding metal fitting according to the embodiment of the present invention.
Figure 7:
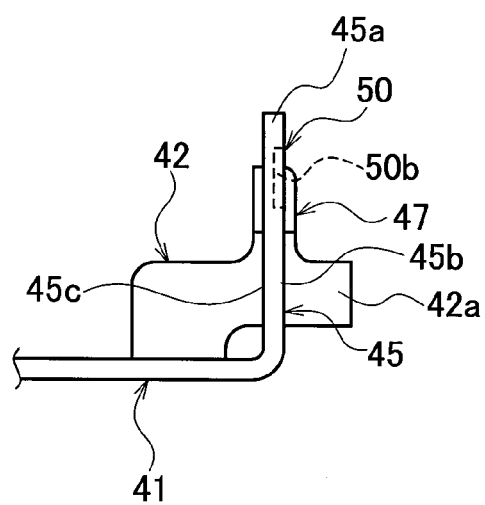
FIG. 7 is a cross-sectional view of the holding metal fitting shown in FIG. 6.

FIG. 6 and FIG. 7 are views showing a first modified example of the holding metal fitting 40. This modified example is different from the embodiment mainly in that each engagement portion 50 is formed as a recessed portion 50*b* provided in the wall surface of the corresponding anchor portion 45.

To be more precise, the recessed portions 50*b* of this modified example are formed as the circular recessed portions 50*b* that are respectively provided in the outer wall surfaces 45*b* of the pair of anchor portions 45 and are located on the tip end portions 45*a* side of the pair of anchor portions 45.

This modified example having the above-described configuration can also achieve the same operations and effects as those of the embodiment. Specifically, when a force is applied in the direction to turn over (detach) the side plate portion 41 outward, the anchor portions 45 can be locked to the resin inside the socket housing 21 by way of the recessed portions 50*b*. Thus, it is possible to further suppress the detachment of the holding metal fitting 40.

Note that when each engagement portion 50 is formed in a small size as in this modified example, it is preferable to provide the engagement portion 50 on the tip end portion 45*a* side of the anchor portion 45. If done so, when the force is applied in the direction to turn over the side plate portion 41, the engagement portion 50 is locked at a position distant from the side plate portion 41. Thus, it is possible to further suppress the turn of the holding metal fitting 40.

Figure 8:
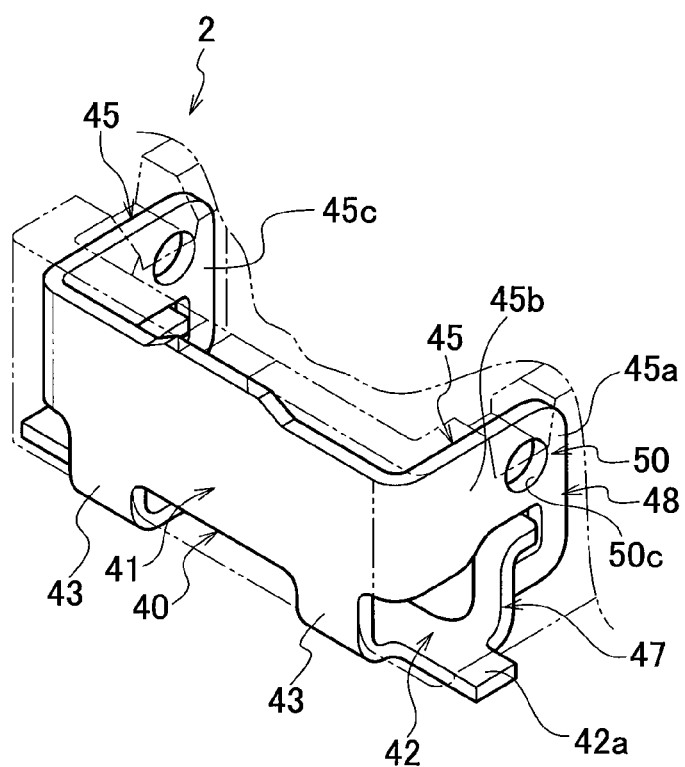
FIG. 8 is a view showing a second modified example of the holding metal fitting according to the embodiment of the present invention.

FIG. 8 is a view showing a second modified example of the holding metal fitting 40. This modified example is different from the embodiment mainly in that each engagement portion 50 is formed as a circular hole 50*c* which penetrates from the outer wall surface 45*b* to the inner wall surface 45*c* of the anchor portion 45.

This modified example having the above-described configuration can also achieve the same operations and effects as those of the embodiment and the first modified example.

Figure 9:
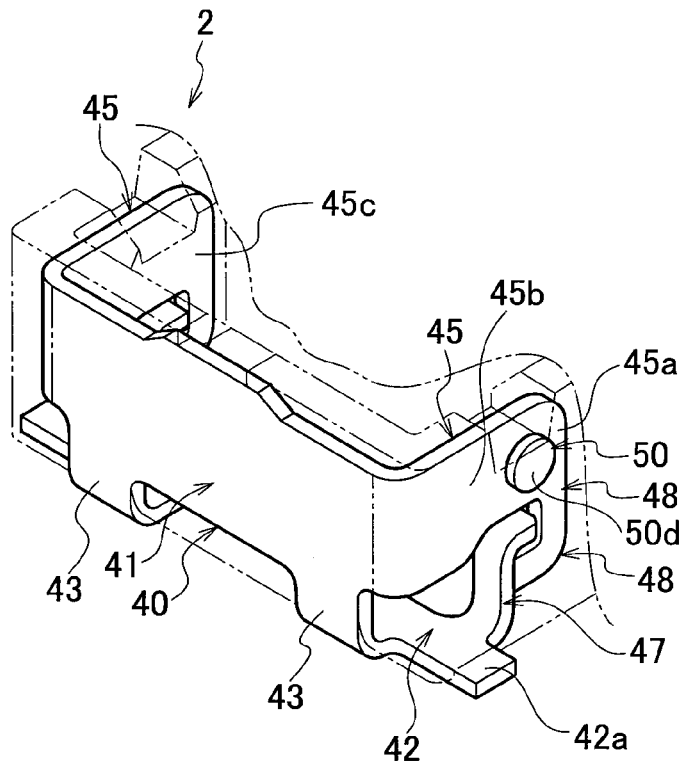
FIG. 9 is a view showing a third modified example of the holding metal fitting according to the embodiment of the present invention.
Figure 10:
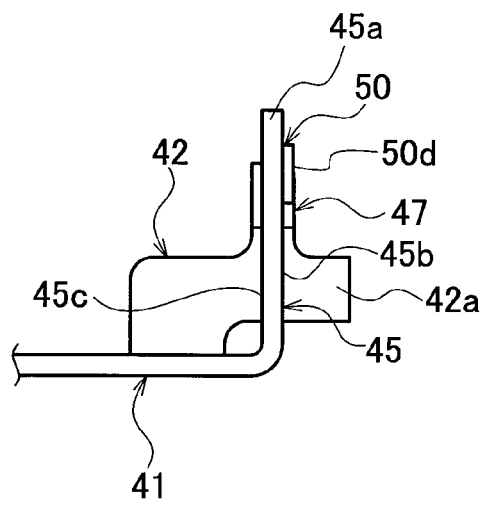
FIG. 10 is a cross-sectional view of the holding metal fitting shown in FIG. 9.

FIG. 9 and FIG. 10 are views showing a third modified example of the holding metal fitting 40. This modified example is different from the embodiment mainly in that each engagement portion 50 is formed as a projecting portion 50*d* provided on the wall surface of the anchor portion 45.

To be more precise, the projecting portions 50*d* of this modified example are formed as the circular projecting portions 50*d* that are respectively provided on the outer wall surfaces 45*b* of the pair of anchor portions 45 in a projecting manner and are located on the tip end portions 45*a* side of the pair of anchor portions 45.

This modified example having the above-described configuration can also achieve the same operations and effects as those of the embodiment and the first and second modified examples.

Figure 11:
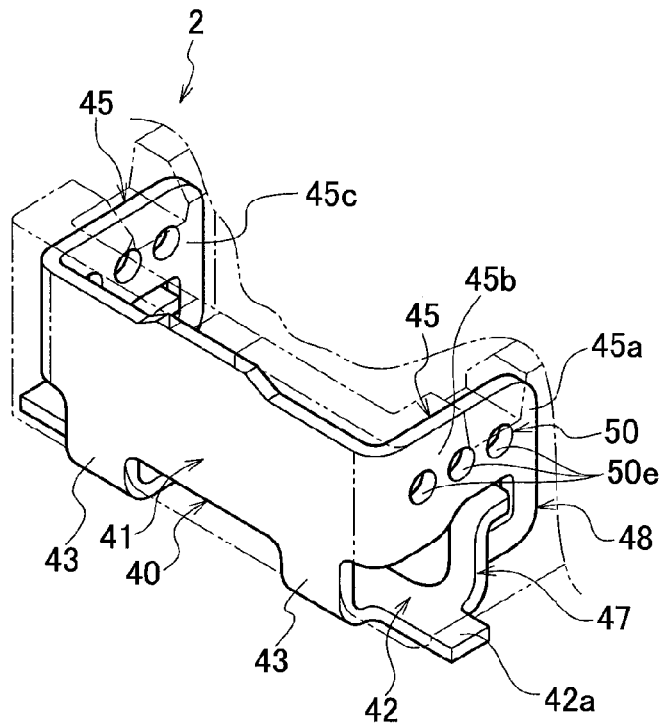
FIG. 11 is a view showing a fourth modified example of the holding metal fitting according to the embodiment of the present invention.
Figure 12:
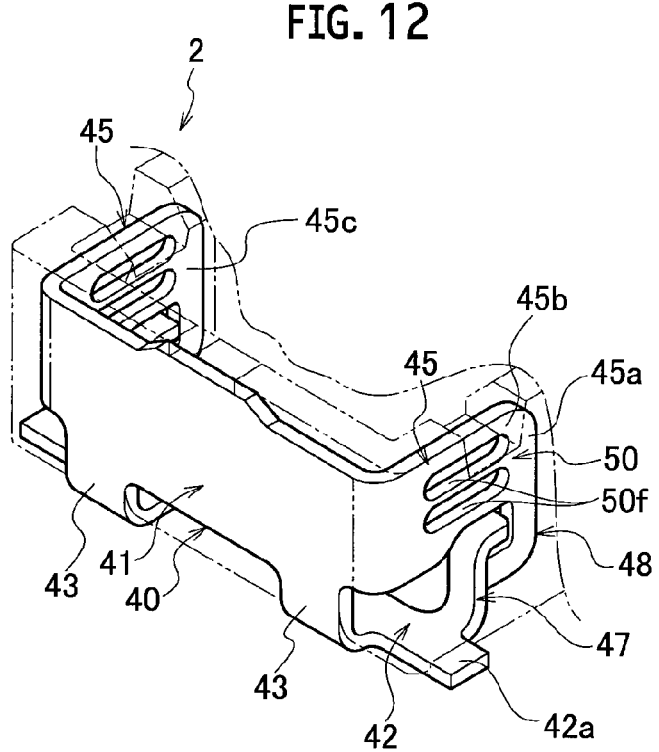
FIG. 12 is a view showing a fifth modified example of the holding metal fitting according to the embodiment of the present invention.

FIG. 11 and FIG. 12 are views showing fourth and fifth modified examples of the holding metal fitting 40. The fourth and fifth modified examples are different from the embodiment mainly in that multiple engagement portions 50 are formed in the wall surface of each anchor portion 45.

Specifically, the engagement portions 50 of the fourth modified example employ circular holes 50*e* similar to the circular holes 50*c* of the second modified example, and three circular holes 50*e* are arranged in the longitudinal direction Y in such a manner as to penetrate from the outer wall surface 45*b* to the inner wall surface 45*c* of each anchor portion 45.

Meanwhile, the engagement portions 50 of the fifth modified example employ long holes 50*f* extending in the longitudinal direction Y, and two long holes 50*f* are arranged in the vertical direction Z in such a manner as to penetrate from the outer wall surface 45b to the inner wall surface 45c of each anchor portion 45.

The fourth and fifth modified examples having the above-described configurations can also achieve the same operations and effects as those of the embodiment and the first to third modified examples.

Moreover, in the fourth and fifth modified examples, the multiple engagement portions 50 are formed in the wall surface of each anchor portion 45. Accordingly, these modified examples have an advantage that it is possible to enhance the engagement strength between the engagement portions 50 and the resin inside the socket housing 21. Thus, the modified examples can further prevent the detachment of the holding metal fitting 40 and destruction of the peripheral wall portion 26 of the socket housing 21.

Although the preferred embodiment of the present invention has been described above, it is to be noted that the present invention is not limited only to the embodiment or the modified examples described above, and that various modifications are possible.

For example, in the embodiment, each engagement portion is formed to penetrate (retract or project) in the width direction of the corresponding anchor portion. However, the invention is not limited only to this configuration. Such an engagement portion may be provided in the vertical direction of the anchor portion by providing a top wall surface of the anchor portion with a cutout portion which is recessed downward, for instance.

Meanwhile, in the embodiment, the anchor portions are formed by bending the two ends in the width direction of the side plate portion toward the center in the longitudinal direction. However, the invention is not limited only to this configuration. For example, like the bottom plate portions, the anchor portions may be formed by bending upper sides of the two end portions of the side plate portion toward the center in the longitudinal direction. In this case, through-holes vertically penetrating through the anchor portions may be provided as the engagement portions.

In the first modified example or the third modified example, the outer wall surface of each anchor portion is provided with the recessed portion or the projecting portion serving as the engagement portion. Instead, the inner wall surface of each anchor portion may be provided with such an engagement portion, or both of the outer wall surface and the inner wall surface thereof may be provided with such engagement portions.

In the fourth modified example and the fifth modified example, the multiple through-holes (circular holes or long holes) are employed as the engagement portions. Instead, multiple recessed portions or multiple projecting portions may be employed as the engagement portions.

In the embodiment and the modified examples, only one of the through-hole, the recessed portion, and the projecting portion is provided as the engagement portion. Instead, any two of them may be provided as the engagement portions, or all the three of them may be provided as the engagement portions.

Figure 13:
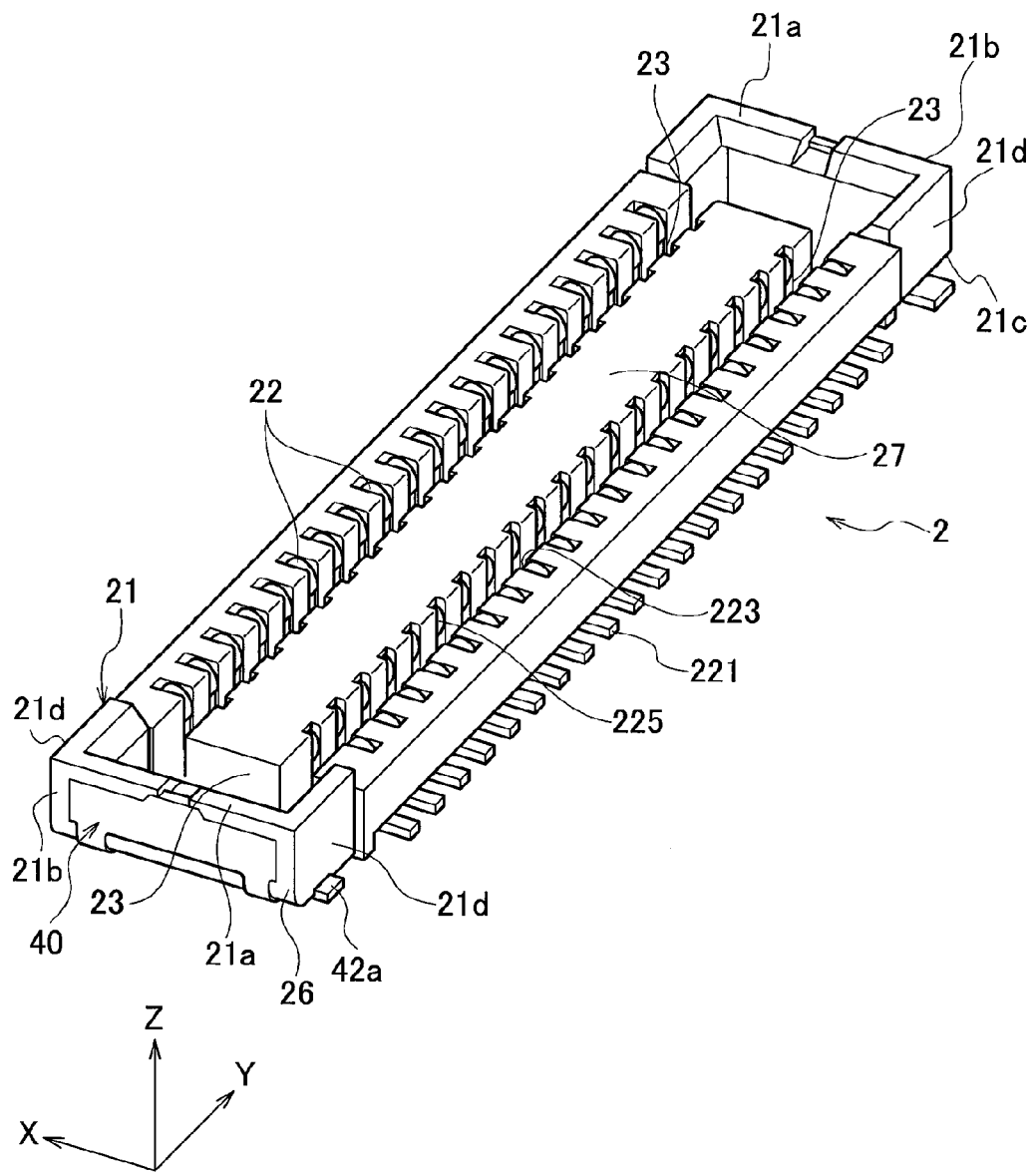
FIG. 13 is a view showing a modified example of the socket of the connector according to the embodiment of the present invention.
Figure 14:
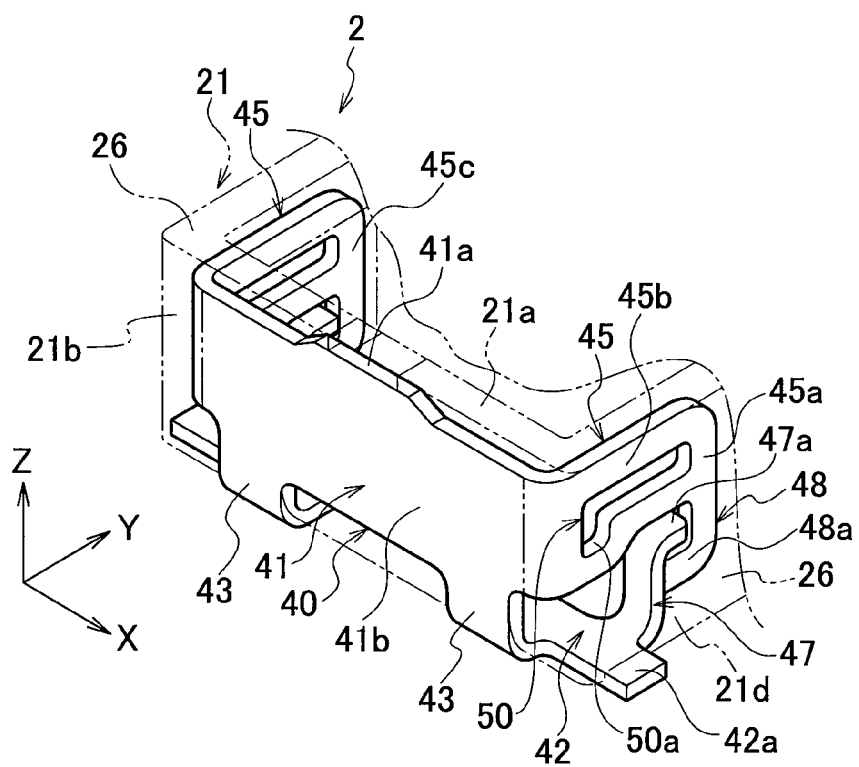
FIG. 14 is a see-through perspective view showing a state in which the holding metal fitting is attached to the socket housing, which is illustrated in FIG. 13.

In the embodiment and the modified examples, the anchor portions of the holding metal fitting are exposed from regions of the peripheral wall portion at the two end portions in the width direction of the socket housing. Instead, the anchor portions do not have to be exposed as in a modified example shown in FIG. 13 and FIG. 14.

The embodiment and the modified examples show the case of disposing the holding metal fitting on the socket that serves as the connector coupler. Instead, the holding metal fitting may be disposed on the header that serves as the connector coupler.

It is to be also noted that the specifications including the shapes, sizes, materials, and the like of the housings of the connector couplers, the contacts, the posts, and so forth may also be changed as appropriate.

REFERENCE SIGNS LIST

1 connector
2 socket (connector coupler)
3 header (connector coupler)
21 socket housing (housing)
40 holding metal fitting
41 side plate portion
42 bottom plate portion
42a attachment piece portion
45 anchor portion
45b outer wall surface (wall surface)
45c inner wall surface (wall surface)
50 engagement portion
X width direction
Y longitudinal direction
Z vertical direction

The invention claimed is:

1. A holding metal fitting buried in a housing of a connector coupler, comprising:
    a side plate portion extending in a width direction of the connector coupler;
    a bottom plate portion connected to a lower side of the side plate portion;
    an attachment piece portion projecting from the bottom plate portion to the outside of the housing and being attached and fixed to a circuit board; and
    an anchor portion extending from the side plate portion into the housing, wherein a wall surface of the anchor portion includes an engagement portion formed in the width direction for a resin inside the housing to engage with, the engagement portion being caught and locked with the resin.

2. The holding metal fitting of claim 1, wherein the engagement portion is a recessed portion formed in the wall surface of the anchor portion.

3. The holding metal fitting of claim 1, wherein the engagement portion is a through-hole formed to penetrate through the wall surface of the anchor portion.

4. The holding metal fitting of claim 1, wherein the engagement portion is a projecting portion formed to project from the wall surface of the anchor portion.

5. The holding metal fitting of claim 1, wherein the anchor portion extends from the side plate portion along a longitudinal direction of the connector coupler.

6. The holding metal fitting of claim 1, wherein the wall surface of the anchor portion includes a plurality of the engagement portions.

7. A connector coupler comprising the holding metal fitting according to claim 1.

8. A connector comprising connector couplers, wherein at least one of the connector couplers is the connector coupler according to claim 7.

9. A connector coupler comprising:
    a housing including a resin;
    a metal fitting partially buried in the housing, wherein:
    the metal fitting comprises:
        a side plate extending in a width direction of the connector coupler;

a bottom plate connected to a lower side of the side plate;

an attachment piece projecting from the bottom plate to an outside of the housing, to be attached and fixed to a circuit board; and an anchor extending from the side plate into the housing, a wall surface of the anchor includes an engagement portion formed in the width direction, and the engagement portion is caught and locked with the resin of the housing.

10. The connector coupler of claim 9, wherein the engagement portion is a recessed portion formed in the wall surface of the anchor.

11. The connector coupler of claim 9, wherein the engagement portion is a through-hole formed to penetrate through the wall surface of the anchor.

12. The connector coupler of claim 9, wherein the engagement portion is a projection formed to project from the wall surface of the anchor.

13. The connector coupler of claim 9, wherein the anchor extends from the side plate along a longitudinal direction of the connector coupler.

14. The connector coupler of claim 9, wherein the wall surface of the anchor includes a plurality of engagement portions.

* * * * *